United States Patent
Joyce et al.

(10) Patent No.: US 7,122,791 B2
(45) Date of Patent: Oct. 17, 2006

(54) CAPILLARIES FOR MASS SPECTROMETRY

(75) Inventors: Timothy H. Joyce, Mountain View, CA (US); Jennifer Qing Lu, Milpitas, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 55 days.

(21) Appl. No.: 10/934,288

(22) Filed: Sep. 3, 2004

(65) Prior Publication Data

US 2006/0049347 A1    Mar. 9, 2006

(51) Int. Cl.
*H01J 49/10* (2006.01)

(52) U.S. Cl. .................................. 250/288; 250/423 R
(58) Field of Classification Search ............... 250/288, 250/281, 282, 423 R; 210/198.2, 656
See application file for complete search history.

(56) References Cited

U.S. PATENT DOCUMENTS

| | | | | |
|---|---|---|---|---|
| 5,624,539 | A * | 4/1997 | Ewing et al. | 204/451 |
| 6,287,765 | B1 * | 9/2001 | Cubicciotti | 435/6 |
| 6,600,076 | B1 * | 7/2003 | Abbott et al. | 568/21 |
| 6,744,046 | B1 * | 6/2004 | Valaskovic et al. | 250/288 |
| 7,007,710 | B1 * | 3/2006 | Heller et al. | 137/15.01 |
| 2003/0052008 | A1 * | 3/2003 | Liu et al. | 204/459 |
| 2003/0119193 | A1 * | 6/2003 | Hess et al. | 436/44 |
| 2003/0180965 | A1 * | 9/2003 | Yobas et al. | 436/180 |
| 2004/0126890 | A1 * | 7/2004 | Gjerde et al. | 436/53 |
| 2004/0223880 | A1 * | 11/2004 | Gjerde et al. | 422/70 |
| 2004/0224362 | A1 * | 11/2004 | Gjerde et al. | 435/7.1 |
| 2004/0224425 | A1 * | 11/2004 | Gjerde et al. | 436/518 |
| 2004/0241721 | A1 * | 12/2004 | Gjerde et al. | 435/6 |
| 2005/0000569 | A1 * | 1/2005 | Bousse et al. | 137/375 |
| 2005/0106585 | A1 * | 5/2005 | Gierde et al. | 435/6 |
| 2005/0116985 | A1 * | 6/2005 | Schurenberg | 347/27 |
| 2005/0131230 | A1 * | 6/2005 | Fenniri | 544/280 |
| 2005/0258360 | A1 * | 11/2005 | Whitehouse et al. | 250/288 |
| 2006/0022131 | A1 * | 2/2006 | Tojo | 250/288 |
| 2006/0097145 | A1 * | 5/2006 | Joyce et al. | 250/284 |
| 2006/0097151 | A1 * | 5/2006 | Seaward et al. | 250/288 |

OTHER PUBLICATIONS

Bruins A., "Mechanistic Aspects of Electrospray Ionization," Journal of Chromatophraphy A, vol. 794, Nos. 1 & 2, 1998.
Cech et al., "Practical Implications of Some Recent Studies in Electrospray Ionization Fundamentals," Mass Spectrometry Reviews. vol. 20, pp. 362-387, 2001.
Dai H., "Carbon Nanotubes: Opportunities and Challenges," Surface Science, vol. 500, pp. 218-241, 2002.
Dai H., "Carbon Nanotubes: Synthesis, Integration, and Properties," Accounts of Chemical Research, vol. 35, pp. 1035-1044, 2002.
Lee et al., "Taylor Cone Stability and ESI Performance for LC-MS at Low Flow Rates" Proceedings of the 50th American Society of Mass Spectrometry Conference on Mass Spectrometry and Allied Topics, 2002.
Juraschek, et al., "Pulsation Phenomena During Electrospray Ionization," International Journal of Mass Spectrometry, vol. 177, No. 1, 1998.
Saito Y., "Preparation and Properties of Carbon Nanotubes," Proceedings of the 1999 International Symposium on Micromechatronics and Human Science, 1999.
Taylor G, "Disintegration of Water Drops in an Electric Field," Proceedings of the Royal Society, Series A—Mathematical and Physical Sciences, vol. 280, No. 1380, 1964.

* cited by examiner

*Primary Examiner*—Kiet T. Nguyen
*Assistant Examiner*—Johnnie L. Smith, II

(57) ABSTRACT

A capillary for a mass spectrometry system is described. The capillary comprises a channel and a tip, and at least one of the channel and the tip comprises a carbon nanotube material that provides a hydrophobic surface.

21 Claims, 3 Drawing Sheets

CAPILLARIES FOR MASS SPECTROMETRY

TECHNICAL FIELD

The technical field of the invention relates to analytical instruments and, in particular, to mass spectrometry.

BACKGROUND

Various analytical instruments can be used for analyzing proteins and other biomolecules. More recently, mass spectrometry has gained prominence because of its ability to handle a wide variety of biomolecules with high sensitivity and rapid throughput. A variety of ion sources have been developed for use in mass spectrometry. Many of these ion sources comprise some type of mechanism that produces charged species through spraying. One particular type of technique that is often used is Electrospray Ionization ("ESI"). One benefit of ESI is its ability to produce charged species from a wide variety of biomolecules such as proteins. Another benefit of ESI is that it can be readily used in conjunction with a wide variety of chemical separation techniques, such as High Performance Liquid Chromatography ("HPLC"). For example, ESI is often used in conjunction with HPLC for identifying proteins.

Typically, ESI produces a spray of ions in a gaseous phase from a sample stream that is initially in a liquid phase. For a conventional ESI mass spectrometry system, a sample stream is pumped through a metal capillary, while a relatively high electric field is applied between a tip of the metal capillary and an electrode that is positioned adjacent to the tip of the metal capillary. As the sample stream exits the tip of the metal capillary, surface charges are produced in the sample stream, thus pulling the sample stream towards the electrode. As the sample stream enters the high electric field, a combined electro-hydrodynamic force on the sample stream is balanced by its surface tension, thus producing a "Taylor cone." Typically, the Taylor cone has a base positioned near the tip of the metal capillary and extends up to a certain distance away from the tip of the metal capillary, beyond which a spray of droplets is produced. As these droplets move towards the electrode, coulombic repulsive forces and desolvation lead to the formation of a spray of ions in a gaseous phase.

During operation of a conventional ESI mass spectrometry system, characteristics of a Taylor cone can affect characteristics of a spray of ions, which, in turn, can affect results of mass spectrometric analysis. Accordingly, it is desirable to produce Taylor cones with certain reproducible characteristics, such that results of mass spectrometric analysis have a desired level of accuracy and reproducibility.

SUMMARY

The invention provides a mass spectrometry system. The mass spectrometry system comprises an ion source comprising a capillary configured to pass a sample stream. The capillary comprises a portion that is exposed to the sample stream when the sample stream passes through the capillary, and the portion of the capillary comprises a carbon nanotube material. The ion source also comprises an electrode positioned with respect to the capillary, wherein, when a voltage between the capillary and the electrode is applied, ions are produced from the sample stream and are directed towards the electrode. The mass spectrometry system also comprises a detector positioned with respect to the ion source to detect the ions.

The invention also provides an ion source for a mass spectrometry system. The ion source comprises a capillary configured to produce a spray of ions and comprising a carbon nanotube material that is hydrophobic.

In another embodiment, the ion source comprises a capillary comprising a tip that comprises a hydrophobic material. The hydrophobic material comprises carbon and is substantially ordered. The ion source also comprises an electrode positioned adjacent to the capillary. The ion source further comprises a power source in electrical connection with the capillary and the electrode, and the power source is configured to apply a voltage between the capillary and the electrode.

The invention further provides a capillary for a mass spectrometry system.

The capillary comprises a channel and a tip, and at least one of the channel and the tip comprises a carbon nanotube material that provides a hydrophobic surface.

Advantageously, embodiments of the invention allow Taylor cones to be produced with certain reproducible characteristics, such that results of mass spectrometric analysis have a desired level of accuracy and reproducibility. For some embodiments of the invention, reproducibility of Taylor cones can be achieved by using certain materials that are highly hydrophobic, highly electrically conductive, highly robust, and substantially inert with respect to typical analytes.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
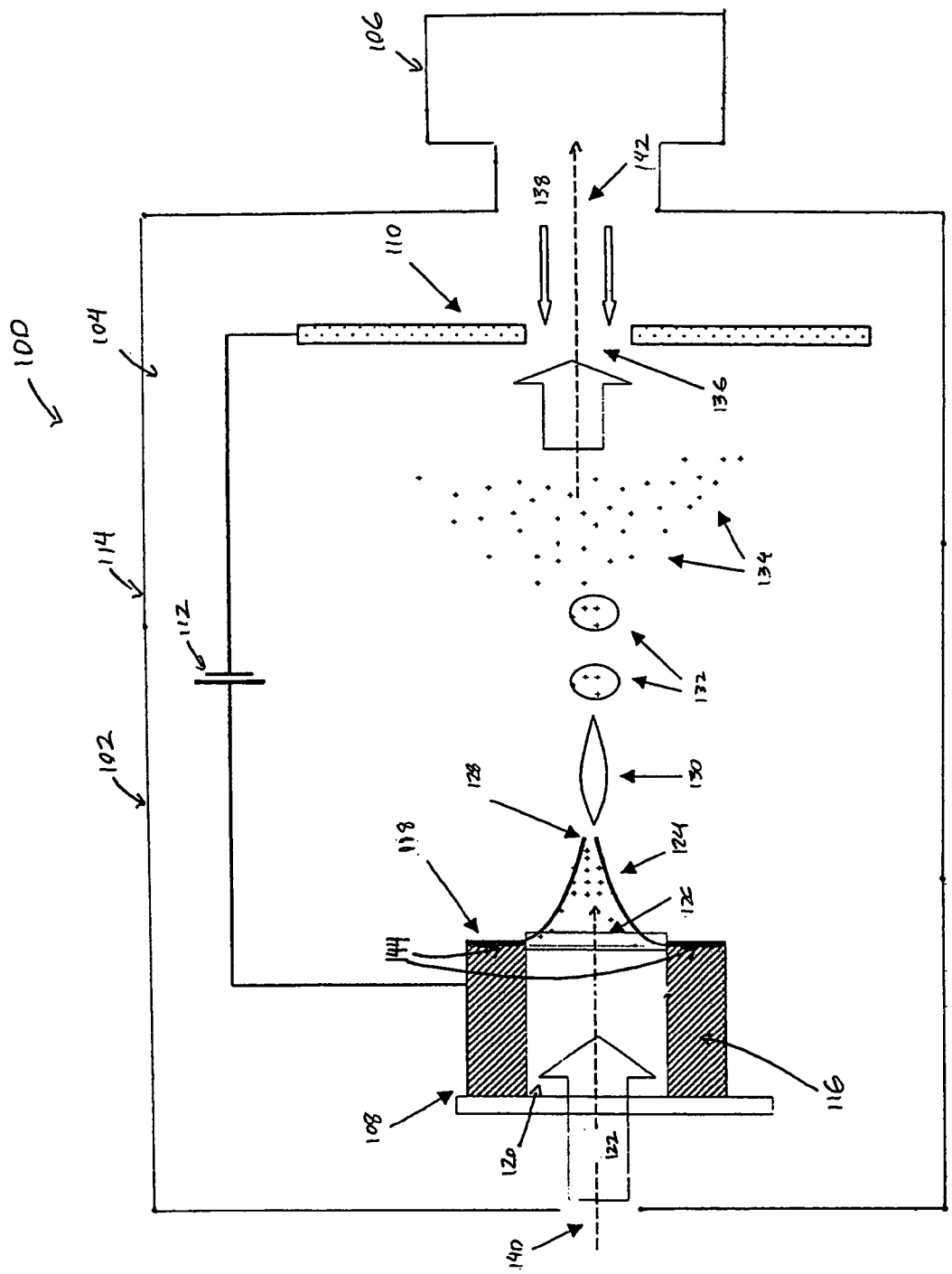
FIG. 1 illustrates a mass spectrometry system implemented in accordance with an embodiment of the invention.

The following definitions apply to some of the elements described with respect to some embodiments of the invention. These definitions may likewise be expanded upon herein.

As used herein, the singular terms "a," "an," and "the" comprise plural referents unless the context clearly dictates otherwise.

As used herein, the term "set" refers to a collection of one or more elements. Thus, for example, a set of nanotubes can comprise a single nanotube or multiple nanotubes. Elements of a set can also be referred to as members of the set. Elements of a set can be the same or different. In some instances, elements of a set can share one or more common characteristics.

As used herein with reference to a sample stream, the term "exposed" refers to being subject to possible interaction with the sample stream. A material can be exposed to a sample stream without being in actual or direct contact with the sample stream. Also, a material can be exposed to a sample stream if the material is subject to possible interaction with a spray of droplets or a spray of ions produced from the sample stream in accordance with an ionization process.

As used herein, the terms "hydrophilic" and "hydrophilicity" refer to an affinity for water, while the terms "hydrophobic" and "hydrophobicity" refer to a lack of affinity for water. Hydrophobic materials typically correspond to those materials to which water has little or no tendency to adhere. As such, water on a surface of a hydrophobic material tends to bead up. One measure of hydrophobicity of a material is a contact angle between a surface of the material and a line tangent to a drop of water at a point of contact with the surface. Typically, the material is considered to be hydrophobic if the contact angle is greater than 90°.

As used herein, the terms "electrically conductive" and "electrical conductivity" refer to an ability to transport an electric current. Electrically conductive materials typically correspond to those materials that exhibit little or no opposition to flow of an electric current. One measure of electrical conductivity of a material is its resistivity expressed in $\Omega \cdot cm$. Typically, the material is considered to be electrically conductive if its resistivity is less than 0.1 $\Omega \cdot cm$. The resistivity of a material can sometimes vary with temperature. Thus, unless otherwise specified, the resistivity of a material is defined at room temperature.

As used herein, the terms "robust" and "robustness" refer to a mechanical hardness or strength. Robust materials typically correspond to those materials that exhibit little or no tendency to fragment under typical operating conditions, such as typical operating conditions of the electrospray capillaries described herein. One measure of robustness of a material is its Vicker microhardness expressed in kg/mm. Typically, the material is considered to be robust if its Vicker microhardness is greater than 1,000 kg/mm.

As used herein, the term "microstructure" refers to a microscopic structure of a material and can encompass, for example, a lattice structure, crystallinity, dislocations, grain boundaries, and the like. One example of a microstructure is a single-walled cylindrical structure, such as comprising a Single-Walled Carbon Nanotube ("SWCNT"). Another example of a microstructure is a multi-walled cylindrical structure, such as comprising a Multi-Walled Carbon Nanotube ("MWCNT"). A further example of a microstructure is an array or arrangement of nanotubes.

As used herein, the term "nanotube" refers to an elongated, hollow structure. Examples of nanotubes comprise those formed from carbon, namely carbon nanotubes. A carbon nanotube can be formed as a SWCNT or a MWCNT. A SWCNT can be represented as a single graphite layer that is rolled into a cylindrical shape. A SWCNT typically has a cross-sectional diameter that is less than about 5 nm, such as from about 0.4 nm to about 4 nm. A MWCNT can be represented as multiple graphite layers that are rolled into concentric cylindrical shapes. A MWCNT typically has a cross-sectional diameter that is about 5 nm or greater, such as from about 5 nm to about 70 nm. Both a SWCNT and a MWCNT typically have lengths from about 0.1 µm to about 1 mm. A MWCNT can sometimes exhibit a greater level of electrical conductivity than a SWCNT and, thus, can be more desirable for certain implementations described herein. Other examples of nanotubes comprise those formed from silicon, gallium nitride, and the like. A nanotube, such as a SWCNT or a MWCNT, typically comprises a substantially ordered array or arrangement of atoms and, thus, can be referred to as being substantially ordered or having a substantially ordered microstructure. It is contemplated that a nanotube can comprise a range of defects and can be doped or surface functionalized. A set of nanotubes can comprise nanotubes that are substantially aligned with respect to one another or with respect to a certain axis, plane, surface, or three-dimensional shape, and, thus, can be referred to as being substantially ordered or having a substantially ordered microstructure. Nanotubes can be formed using any of a wide variety of techniques, such as using arc-discharge, laser ablation, and chemical vapor deposition.

As used herein, the term "ionization efficiency" refers to a ratio of the number of ions formed in an ionization process and the number of electrons or photons used in the ionization process.

Attention first turns to FIG. 1, which illustrates a mass spectrometry system 100 implemented in accordance with an embodiment of the invention. The mass spectrometry system 100 comprises an ion source 102, which operates to produce ions. In the illustrated embodiment, the ion source 102 operates to produce ions using ESI. However, it is contemplated that the ion source 102 can be implemented to produce ions using any other ionization process. As illustrated in FIG. 1, the mass spectrometry system 100 also comprises a detector 106, which is positioned with respect to the ion source 102 to receive ions. The detector 106 operates to detect ions as a function of mass and charge.

In the illustrated embodiment, the ion source 102 comprises an electrospray capillary 108 and an electrode 110, which is positioned adjacent to the electrospray capillary 108 and serves as a counter-electrode with respect to the electrospray capillary 108. The ion source 102 also comprises a power source 112, which is electrically connected to the electrospray capillary 108 and to the electrode 110. The power source 112 operates to apply a voltage to the electrospray capillary 108 and the electrode 110, thus producing an electric field between the electrospray capillary 108 and the electrode 110. As illustrated in FIG. 1, the ion source 102 also comprises a housing 114, which defines an internal chamber 104 within which the electrospray capillary 108, the electrode 110, and the power source 112 are positioned.

As illustrated in FIG. 1, the electrospray capillary 108 comprises a channel 116 and a tip 118. The channel 116 defines an internal passageway 120 through which a sample stream 122 passes. The sample stream 122 comprises analytes to be analyzed by the mass spectrometry system 100. For example, the sample stream 122 can comprise biomolecules that are dispersed in a suitable solvent, such as water. In the illustrated embodiment, the positioning of the electrospray capillary 108 in the vicinity of the electrode 110 at a negative bias produces an electric field gradient at the tip 118 of the electrospray capillary 108. As the sample stream 122 exits the tip 118 of the electrospray capillary 108, a jump in displacement flux density produces surface charges in the sample stream 122, which pulls the sample stream 122 towards the electrode 110. In conjunction, a combined electro-hydrodynamic force on the sample stream 122 is balanced by its surface tension, thus producing a Taylor cone 124. As illustrated in FIG. 1, the Taylor cone 124 comprises a base 126 positioned near the tip 118 of the electrospray capillary 108. The Taylor cone 124 also comprises a tip 128, which extends into a filament 130. As the filament 130 extends further towards the electrode 110, combined effects of surface tension, coulombic repulsive forces, and small perturbations cause the filament 130 to break up and to form a spray of droplets 132. As these droplets 132 move towards the electrode 110, coulombic repulsive forces and desolvation lead to the formation of a spray of ions 134.

As illustrated in FIG. 1, the electrode 110 comprises an aperture 136 near its center. The ions 134 pass through the electrode 110 via the aperture 136 and eventually reach the detector 106. In the illustrated embodiment, a drying gas 138, such as a nitrogen gas, flows in a direction counter to the ions 134 to improve ionization efficiency and to restrain introduction of undesirable materials into the aperture 136. In the illustrated embodiment, the electrode 110 is positioned in a longitudinal relationship with respect to the electrospray capillary 108. In other words, an angle defined by a central axis 140 of the internal passageway 120 and a central axis 142 of the aperture 136 is substantially at 0°. However, it is contemplated that this angle can be adjusted to differ from 0°, such as from about 75° to about 105°. For example, it is contemplated that the electrode 110 can be positioned in an orthogonal relationship with respect to the electrospray capillary 108, such that this angle is substantially at 90°.

During operation of the mass spectrometry system 100, characteristics of the Taylor cone 124 can affect characteristics of the ions 134 that are produced, which, in turn, can affect results of mass spectrometric analysis. Accordingly, it is desirable to produce Taylor cones with certain reproducible characteristics, such that results of mass spectrometric analysis have a desired level of accuracy and reproducibility. In the illustrated embodiment, Taylor cones can be produced with reproducible characteristics by controlling hydrophobicity of the electrospray capillary 108. In particular, if the tip 118 of the electrospray capillary 108 is made sufficiently hydrophobic, the base 126 of the Taylor cone 124 can be restrained from spreading along the tip 118 of the electrospray capillary 108. In such manner, the base 126 of the Taylor cone 124 can be produced with a reproducible shape and size, which can correspond to a shape and size of the internal passageway 120 at the tip 118 of the electrospray capillary 108.

As illustrated in FIG. 1, the tip 118 of the electrospray capillary 108 comprises a hydrophobic material 144. For certain implementations, the hydrophobic material 144 can form a coating that at least partly covers one end of the channel 116, which serves as a substrate. In general, the hydrophobic material 144 can correspond to any of a wide variety of hydrophobic materials. Particularly useful hydrophobic materials correspond to those materials that exhibit a combination of desirable characteristics, comprising hydrophobicity, electrical conductivity, and robustness. In terms of hydrophobicity, particularly useful hydrophobic materials correspond to those materials that provide a hydrophobic surface, such that Taylor cones can be produced with a reproducible shape and size. In particular, the hydrophobic surface desirably exhibits a contact angle with respect to water that is greater than 90°, such as greater than about 100°, greater than about 105°, or greater than about 110°. In terms of electrical conductivity, particularly useful hydrophobic materials correspond to those materials that comprise a relatively low resistivity, such that an electric field can be properly applied between the tip 118 of the electrospray capillary 108 and the electrode 110. In particular, the resistivity is desirably less than 0.1 Ω·cm, such as less than about 0.01 Ω·cm, less than about 0.001 Ω·cm, or less than about 0.0001 Ω·cm. As can be appreciated, use of hydrophobic materials comprising a relatively low resistivity can avoid the need for an additional coating of an electrically conductive material, which additional coating can adversely affect hydrophobicity of the tip 118 of the electrospray capillary 108. In terms of robustness, particularly useful hydrophobic materials correspond to those materials that exhibit little or no tendency to fragment under typical operating conditions of the electrospray capillary 108, thus increasing operational lifetime of the electrospray capillary 108. In particular, the Vicker microhardness of those materials is desirably greater than 1,000 kg/mm, such as greater than about 2,000 kg/mm, greater than about 2,500 kg/mm, or greater than about 3,000 kg/mm. For example, the Vicker microhardness is desirably from about 2,500 kg/mm to about 3,500 kg/mm.

It has been discovered that certain nanotube materials can be particularly useful hydrophobic materials, since these nanotube materials can exhibit the combination of desirable characteristics described above. In the illustrated embodiment, the hydrophobic material 144 desirably corresponds to a carbon nanotube material, which can comprise a set of carbon nanotubes. However, it is contemplated that other types of nanotube materials, such as those comprising nanotubes formed from gallium nitride, can be used in place of, or in combination, with the carbon nanotube material. Advantageously, the carbon nanotube material can exhibit a higher level of hydrophobicity, a higher level of electrical conductivity, and a higher level of robustness as compared with certain other types of hydrophobic materials. A further benefit of the carbon nanotube material is its substantial inertness with respect to typical analytes that can comprise the sample stream 122. Without wishing to be bound by a particular theory, it is believed that a substantially ordered microstructure of the carbon nanotube material contributes to at least some of its desirable and unusual characteristics.

For certain implementations, the carbon nanotube material can form a coating, which can be applied using any of a wide variety of techniques. For example, the carbon nanotube material can be sprayed at high velocity onto a substrate, such that the carbon nanotube material mechanically adheres to the substrate. As another example, the carbon nanotube material can be dispersed in a suitable solvent to form a "paint," and this paint can be applied to the substrate. In some instances, the solvent can be relatively inert. However, it is also contemplated that the solvent can facilitate chemical bonding between the carbon nanotube material and the substrate. Heat can be applied to evaporate the solvent or to promote chemical bonding.

While FIG. 1 illustrates the tip 118 of the electrospray capillary 108 as comprising the hydrophobic material 144, it is contemplated that other portions of the electrospray capillary 108 can comprise the hydrophobic material 144. In particular, it is contemplated that any portion of the electrospray capillary 108 that is exposed to the sample stream 122 can comprise the hydrophobic material 144. For example, the channel 116 can also comprise the hydrophobic material 144, which can form a coating that at least partly covers a surface surrounding the internal passageway 120. Such implementation can facilitate a flow of the sample stream 122 through the electrospray capillary 108, which, in turn, can allow Taylor cones to be produced with reproducible characteristics. In general, it is contemplated that different portions of the electrospray capillary 108 can comprise hydrophobic materials that are the same or different. It is also contemplated that the electrospray capillary 108 can be substantially formed of the hydrophobic material 144.

Figure 2:
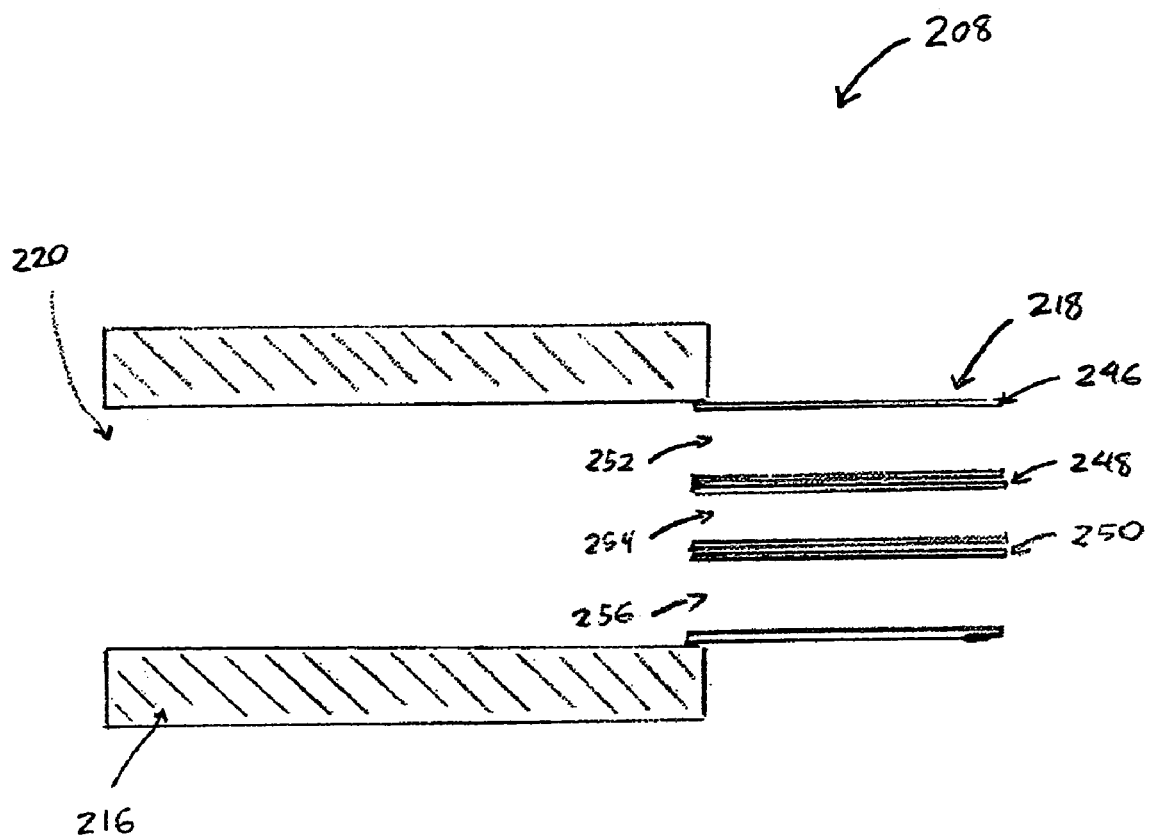
FIG. 2 illustrates an electrospray capillary comprising a set of nanotubes, according to an embodiment of the invention.

Attention next turns to FIG. 2, which illustrates an electrospray capillary 208 implemented in accordance with another embodiment of the invention. As illustrated in FIG. 2, the electrospray capillary 208 comprises a channel 216 and a tip 218. The channel 216 defines an internal passageway 220 through which a sample stream can pass. In the illustrated embodiment, the tip 218 of the electrospray capillary 208 comprises a set of nanotubes, namely carbon nanotubes 246, 248, and 250. As illustrated in FIG. 2, the carbon nanotubes 246, 248, and 250 are substantially aligned with respect to one another to form the tip 218 of the electrospray capillary 208. While three carbon nanotubes 246, 248, and 250 are illustrated in FIG. 2, it is contemplated that more or less carbon nanotubes can be used for other implementations. The carbon nanotubes 246, 248, and 250 define respective internal passageways 252, 254, and 256 through which the sample stream can exit the electrospray capillary 208. As the sample stream exits the tip 218 of the electrospray capillary 208, Taylor cones can be formed at respective ends of the carbon nanotubes 246, 248, and 250. In the illustrated embodiment, the carbon nanotubes 246, 248, and 250 can be selected to have cross-sectional diameters of sufficient size to allow a flow of certain analytes, such as biomolecules. For certain implementations, the carbon nanotubes 246, 248, and 250 are desirably MWCNTs because of their typically larger cross-sectional diameters as compared with SWCNTs. The electrospray capillary 208 can be formed using any of a wide variety of techniques. For example, the carbon nanotubes 246, 248, and 250 can be positioned with respect to the channel 216 using an Atomic Force Microscope ("AFM"). As another example, the channel 216 can serve as a substrate, and the carbon nanotubes 246, 248, and 250 can be formed on the channel 216 using arc-discharge, laser ablation, or chemical vapor deposition. It is contemplated that other types of nanotubes, such as those formed from gallium nitride, can be used in place of, or in combination, with the carbon nanotubes 246, 248, and 250.

Figure 3:
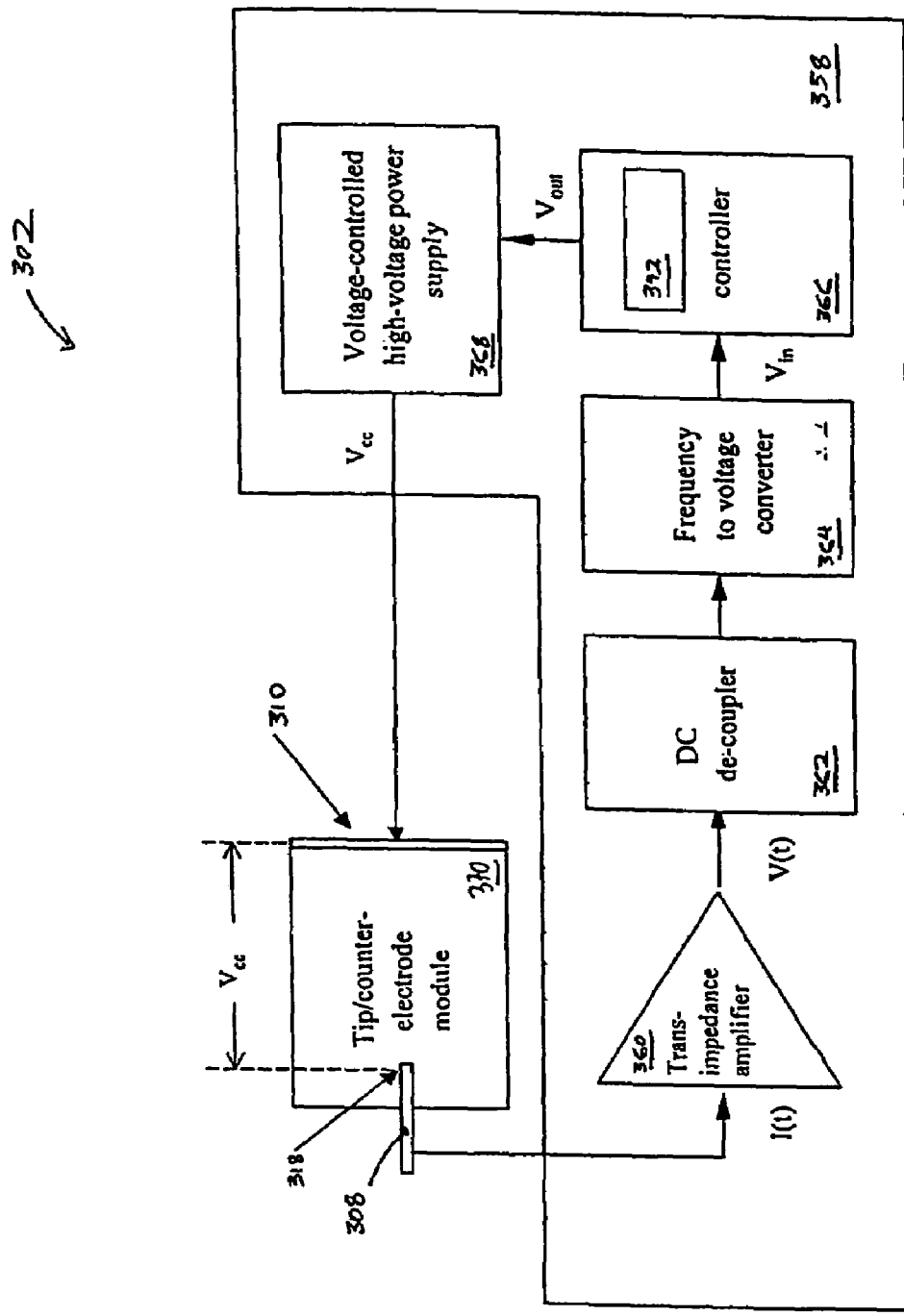
FIG. 3 illustrates an ion source comprising a feedback controller, according to an embodiment of the invention.

It should be recognized that the embodiments of the invention described above are provided by way of example, and various other embodiments are encompassed by the invention. For example, it is contemplated that the electrospray capillaries described herein can be advantageously used in conjunction with a control mechanism to regulate a spray of ions. One example of such a control mechanism is a feedback controller as described in the co-pending and co-owned patent application of Sobek, U.S. patent application Ser. No. 10/896,981, filed Jul. 23, 2004, entitled "Ion Source Frequency Feedback Device and Method," the disclosure of which is incorporated herein by reference in its entirety. FIG. 3 illustrates an ion source 302 comprising a feedback controller 358, in accordance with an embodiment of the invention. The feedback controller 358 operates to detect a modulation frequency of an ionization current I(t) between a tip 318 of an electrospray capillary 308 and a counter-electrode 310, which are positioned in a module 370. Based on this modulation frequency, the feedback controller 358 operates to provide feedback regulation of ESI characteristics by adjusting a voltage $V_{cc}$ between the tip 318 of the electrospray capillary 308 and the counter-electrode 310.

With reference to FIG. 3, the ionization current I(t) between the electrospray capillary 308 and the counter-electrode 310 can experience transient fluctuations in amplitude (i.e., can be modulated) depending on operating conditions of the ion source 302. In particular, depending on the voltage $V_{cc}$, modulation of the ionization current I(t) can have characteristics associated with one of a variety of ESI modes, comprising: (1) a pulsating mode with lower modulation frequencies ("mode I"); (2) a constant-amplitude oscillation mode with intermediate modulation frequencies ("mode II"); and (3) a continuous emission mode with higher modulation frequencies ("mode III"). Among these three modes, mode II and mode III typically provide the most desirable ESI characteristics. Advantageously, a correlation between a magnitude of the modulation frequency and the different ESI modes allows the modulation frequency to be used as an indicator of a particular ESI mode under which the ion source 302 is currently operating. In turn, the voltage $V_{cc}$ can be adjusted until the modulation frequency has a magnitude associated with a desired ESI mode. However, the modulation frequency typically depends on characteristics of a Taylor cone that is produced, such as a size of a base of the Taylor cone. Accordingly, in order for the modulation frequency to be an accurate and reproducible indicator of a particular ESI mode, it is desirable to produce Taylor cones with reproducible characteristics. In the illustrated embodiment, Taylor cones can be produced with reproducible characteristics by controlling hydrophobicity of the electrospray capillary 308 in a similar manner as described above. In particular, if the tip 318 of the electrospray capillary 308 is made sufficiently hydrophobic, Taylor cones can be produced with bases of a reproducible shape and size.

As illustrated in FIG. 3, the feedback controller 358 comprises a transimpedance amplifier 360, a DC de-coupler 362, a frequency-to-voltage converter 364, a controller 366, and a voltage-controlled high-voltage power supply 368. The transimpedance amplifier 360, the DC de-coupler 362, the frequency-to-voltage converter 364, the controller 366, and the voltage-controlled high-voltage power supply 368 comprise a closed feedback loop to provide feedback regulation of ESI characteristics. The transimpedance amplifier 360 operates to convert the ionization current I(t) into a voltage V(t). Since typical nano-flow ionization currents can range from about 5 nA to about 150 nA and can exhibit modulation frequencies up to about 200 KHz, the transimpedance amplifier 360 desirably has a bandwidth of at least about 400 kHz and a gain of about $10^7$. Amplifiers with such specifications are commercially available. Alternatively, the transimpedance amplifier 360 can be implemented using a two-stage Op-Amp design, such as using a low noise transimpedance module for current to voltage conversion and a boost Op-Amp stage for further signal amplification.

The DC de-coupler 362 operates to remove a Direct Current ("DC") component of the voltage V(t). In turn, the frequency-to-voltage converter 364 responds to an input frequency of the voltage V(t) and delivers to the controller 366 an input voltage $V_{in}$ that is linearly proportional to this input frequency. In other words, the transimpedance amplifier 360, the DC de-coupler 362, and the frequency-to-voltage converter 364 operate to convert frequency information in the ionization current I(t) into the input voltage $V_{in}$.

In the illustrated embodiment, the controller 366 can be implemented using a microprocessor 372 that operates to produce an output voltage $V_{out}$ from the input voltage $V_{in}$ in accordance with a set of processor-executable instructions. The output voltage $V_{out}$ controls the voltage-controlled high-voltage power supply 368, which applies the voltage $V_{cc}$ between the tip 318 of the electrospray capillary 308 and the counter-electrode 310. As illustrated in FIG. 3, the voltage $V_{cc}$ is proportional to the output voltage $V_{out}$. The voltage $V_{cc}$ can be a DC voltage or a DC voltage with an Alternating Current ("AC") component. For certain implementations, the DC voltage can be used to establish a highest possible electric field for which there is no ESI action. High-voltage AC pulses can be superimposed on the DC voltage to elicit on-demand droplet formation. The AC pulses can be produced using suitable high voltage amplifier circuits and can be, for example, sinusoidal, square-shaped, or triangular-shaped. A shape and a duty cycle of the AC pulses can be adjusted to control characteristics of a Taylor cone, thus creating a spray of ions with desired characteristics. It is contemplated that the AC pulses can be synchronized with respect to sampling electronics to provide for a desired level of sensitivity and repeatability.

In the illustrated embodiment, the voltage $V_{cc}$ is applied to the counter-electrode 310, while the transimpedance amplifier 360 is electrically connected to the electrospray capillary 308, which is grounded. However, it is contemplated that the voltage $V_{cc}$ can be applied to the tip 318 of the electrospray capillary 308, and the ionization current I(t) can be detected at the tip 318 of the electrospray capillary 308 or at the counter-electrode 310. It is contemplated that a voltage-controlled flow rate controller can be used in place of, or in conjunction with, the voltage-controlled high-voltage power supply 368. The voltage-controlled flow rate controller can operate to adjust a flow rate of a sample fluid passing through the electrospray capillary 308 based on the output voltage $V_{out}$.

Desirably, the module 370 is shielded from interfering signals to improve a signal-to-noise ratio for the operations described above. Proper shielding can be achieved by, for example, using a grounded electrically conductive housing. Connections in and out of the housing can be implemented using coaxial cables.

A practitioner of ordinary skill in the art should require no additional explanation in developing the electrospray capillaries described herein but may nevertheless find some helpful guidance by examining the following articles: Taylor G. I., "Disintegration of Water Drops in an Electric Field," *Proceedings of the Royal Society of London*, vol. A280, pp. 383–397, 1964; Bruins A. P., "Mechanistic Aspects of Electrospray Ionization," *Journal of Chromatography A*, vol. 794, pp. 345–347, 1998; Juraschek et al., "Pulsation Phenomena During Electrospray Ionization," *International Journal of Mass Spectrometry*, vol. 177, pp. 1–15, 1998; Cech et al., "Practical Implications of Some Recent Studies in Electrospray Ionization Fundamentals," *Mass Spectrometry Reviews*, vol. 20, pp. 362–387, 2001; and Lee et al., "Taylor Cone Stability and ESI Performance for LC-MS at Low Flow Rates," *Proceedings of the American Society of Mass Spectrometry*, 2002; the disclosures of which are incorporated herein by reference in their entireties. A practitioner of ordinary skill in the art may also find some helpful guidance regarding characteristics and formation of carbon nanotubes by examining the following articles: Saito Y., "Preparation and Properties of Carbon Nanotubes," 1999 *International Symposium on Micromechatronics and Human Science,* 1999; Dai H., "Carbon Nanotubes: Synthesis, Integration, and Properties," *Accounts of Chemical Research*, vol. 35, pp. 1035–1044, 2002; and Dai H., "Carbon Nanotubes: Opportunities and Challenges," *Surface Science*, vol. 500, pp. 218–241, 2002; the disclosures of which are incorporated herein by reference in their entireties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A capillary for a mass spectrometry system, comprising:
   a channel and a tip, at least one of the channel and the tip comprising a coating of a carbon nanotube material that provides a hydrophobic surface.

2. The capillary of claim 1, wherein the tip comprises the coating of the carbon nanotube material.

3. The capillary of claim 1, wherein the hydrophobic surface exhibits a contact angle with respect to water that is greater than 100°.

4. The capillary of claim 3, wherein the contact angle is greater than 105°.

5. The capillary of claim 1, wherein the carbon nanotube material comprises a resistivity that is less than 0.1 Ω·cm.

6. The capillary of claim 5, wherein the risistivity is less than 0.01 Ω·cm.

7. An ion source for a mass spectrometry system, comprising:
   a capillary configured to produce a spray of ions and comprising a set of carbon nanotubes that are substantially aligned with respect to one another and provides a hydrophobic surface to regulate the spray of ions.

8. The ion source of claim 7, wherein at least one of the set of carbon nanotubes is a multi-walled carbon nanotube.

9. The ion source of claim 8, wherein the multi-walled carbon nanotube has a cross-sectional diameter that is in the range of 5 nm to 70 nm.

10. The ion source of claim 7, wherein the capillary comprises a tip that comprises the set of carbon nanotubes.

11. The ion source of claim 7, further comprising:
    an electrode positioned adjacent to the capillary, the electrode comprising an aperture configured to receive the spray of ions when a voltage between the capillary and the electrode is applied.

12. The ion source of claim 11, further comprising:
    a feedback loop in electrical connection with the capillary and the electrode, the feedback loop being configured to regulate the spray of ions by adjusting the voltage between the capillary and the electrode.

13. An ion source for a mass spectrometry system, comprising:
    a capillary comprising a tip that comprises a hydrophobic material, the hydrophobic material comprising carbon;
    an electrode positioned adjacent to the capillary; and
    a power source in electrical connection with the capillary and the electrode, the power source being configured to apply a voltage between the capillary and the electrode.

14. The ion source of claim 13, wherein the hydrophobic material comprises a carbon nanotube material.

15. The ion source of claim 13, wherein the tip comprises a coating of the hydrophobic material.

16. The ion source of claim 13, wherein the tip comprises a hydrophobic surface that comprises the hydrophobic material, and the hydrophobic surface exhibits a contact angle with respect to water that is greater than 100°.

17. The ion source of claim 13, wherein the hydrophobic material comprises a resistivity that is less than 0.1 Ω·cm.

18. A mass spectrometry system, comprising:
(a) an ion source comprising:
  (i) a capillary configured to pass a sample stream, the capillary comprising a portion that is exposed to the sample stream when the sample stream passes through the capillary, the portion of the capillary comprising a carbon nanotube material; and
  (ii) an electrode positioned with respect to the capillary, wherein, when a voltage between the capillary and the electrode is applied, ions are produced from the sample stream and are directed towards the electrode; and
(b) a detector positioned with respect to the ion source to detect the ions.

19. The mass spectrometry system of claim 18, wherein the carbon nanotube material comprises a multi-walled structure.

20. The mass spectrometry system of claim 18, wherein the carbon nanotube material comprises a single-walled structure.

21. The mass spectrometry system of claim 18, wherein the ion source further comprises:
a feedback loop electrically connected to the capillary and to the electrode, the feedback loop being configured to regulate the voltage between the capillary and the electrode.

* * * * *